(12) United States Patent
Sohn et al.

(10) Patent No.: US 7,624,929 B2
(45) Date of Patent: Dec. 1, 2009

(54) VALVE ARRANGEMENT FOR AN EXPANSION VALVE, ESPECIALLY FOR COOLING UNITS IN VEHICLE AIR CONDITIONING SYSTEMS

(75) Inventors: Jürgen Sohn, Fellbach (DE); Frank Leschert, Aichwald (DE)

(73) Assignee: Otto Egelhof GmbH & Co. KG, Fellbach (DE)

( * ) Notice: Subject to any disclaimer, the term of this patent is extended or adjusted under 35 U.S.C. 154(b) by 337 days.

(21) Appl. No.: 11/208,380

(22) Filed: Aug. 20, 2005

(65) Prior Publication Data
US 2006/0038153 A1 Feb. 23, 2006

(30) Foreign Application Priority Data
Aug. 20, 2004 (DE) .............. 10 2004 040 649

(51) Int. Cl.
*G05D 23/12* (2006.01)
(52) U.S. Cl. .............. 236/92 B; 236/93 A; 236/100
(58) Field of Classification Search ............ 236/92 B, 236/93 A, 100; 251/333
See application file for complete search history.

(56) References Cited

U.S. PATENT DOCUMENTS

| | | | | |
|---|---|---|---|---|
| 2,902,250 A | * | 9/1959 | Bering | ............ 251/120 |
| 3,077,896 A | * | 2/1963 | Weingard | ............ 137/329.06 |
| 3,510,103 A | * | 5/1970 | Carsello | ............ 251/333 |
| 4,524,724 A | * | 6/1985 | Steudler, Jr. | ............ 119/72.5 |
| 4,610,221 A | * | 9/1986 | Steudler, Jr. | ............ 119/72.5 |
| 5,671,890 A | * | 9/1997 | Cooper et al. | ............ 239/533.7 |
| 5,715,996 A | * | 2/1998 | Cooper et al. | ............ 239/533.7 |
| 5,957,376 A | * | 9/1999 | Fujimoto et al. | ............ 236/92 B |
| 6,209,793 B1 | * | 4/2001 | Taguchi | ............ 236/92 B |
| 6,394,360 B2 | * | 5/2002 | Watanabe et al. | ............ 236/92 B |
| 6,431,207 B1 | * | 8/2002 | Weiler, Jr. | ............ 137/596.17 |
| 6,532,753 B2 | * | 3/2003 | Watanabe et al. | ............ 62/115 |
| 6,758,055 B2 | * | 7/2004 | Watanabe et al. | ............ 62/225 |
| 6,895,993 B2 | * | 5/2005 | Kobayashi et al. | ............ 137/454.6 |

\* cited by examiner

*Primary Examiner*—Marc E Norman
(74) *Attorney, Agent, or Firm*—Kriegsman & Kriegsman

(57) ABSTRACT

The invention relates to a valve arrangement for an expansion valve, especially for cooling units in vehicle air conditioning systems, having a valve seat for receiving a valve-closing member, which, in a closing position, fits snugly in the valve seat and closes a passage between a coolant inlet side and a coolant outlet side, the valve seat or the valve-closing member having at least two zones, a first zone forming with the valve-closing member or with the valve seat, in a closing position, a sealing seat, and at least one further zone regulating a coolant mass flow flowing through the passage, and a gradient of the sealing-seat-forming zone differing from a gradient of the at least one further zone.

6 Claims, 3 Drawing Sheets

VALVE ARRANGEMENT FOR AN EXPANSION VALVE, ESPECIALLY FOR COOLING UNITS IN VEHICLE AIR CONDITIONING SYSTEMS

The invention relates to a valve arrangement for an expansion valve, especially for cooling units in vehicle air conditioning systems, having a valve seat for receiving a valve-closing member, by which in a closing position, in the valve seat, a passage between a coolant inlet side and a coolant outlet side is closed.

BACKGROUND OF THE INVENTION

In vehicles, it is becoming increasingly common to equip air conditioning systems with at least one additional evaporator in order to be able, for example, to cool separately at the front and rear or on the left and right side of the interior of the vehicle. To avoid unnecessary power consumption, it is desirable to be able to switch off the additional evaporators when there is no requirement. Use is therefore made of expansion valves comprising a shut-off device, which, in a closing position, closes a coolant inlet opening connected to a condenser and a coolant outlet opening connected to a compressor.

Valve arrangements in an expansion valve have already been disclosed, comprising a conical valve seat in which, in a closing position, a valve-closing member configured as a ball fits snugly in a closing position. Such thermostatic expansion valves are controlled by means of an actuating device, which, for the opening and closing of the valve arrangement, acts upon a transfer pin, which, by a lift motion, transports the valve-closing member out of a closing position in the valve seat into an opening position.

The previously known conical valve seats for receiving a spherical valve-closing member have the drawback that, directly after the valve arrangement is opened, a strong increase in mass flow volume is given by the obtuse angle of the valve seat faces. In order to obtain a fine regulation, an acute angle arrangement of the valve seat faces is necessary. These have the drawback, however, that, in order to induce an opening motion of the valve-closing member, it is necessary to overcome a self-locking mechanism.

SUMMARY OF THE INVENTION

The object of the invention is therefore to provide a valve arrangement which allows easy opening and metering of the volume flow from the outset, directly after the valve arrangement is opened.

This object is achieved according to the invention by virtue of the features of claim 1. Further advantageous embodiments and refinements of the invention are specified in the further claims.

Through the inventive configuration of a valve arrangement with a valve seat having at least two cross-section-determining zones of mutually differing gradients, the mass flow can already be metered directly after a slight lift motion and the valve arrangement can be opened easily and exactly. A first cross-section-determining zone of the valve arrangement forms a sealing seat with a valve-closing member, arranged in a closing position, in the valve seat. At least one further zone, after the valve arrangement is opened, regulates a coolant mass flow, which flows through a gap, formed in the further zone, between the valve seat and the valve-closing member. As a result of the at least two different gradients of the zone-forming areas in the valve seat, the functioning of the valve arrangement and the metering of the mass flow are mutually separated. The mass flow can thus flow through the passage in a controlled manner and without being abruptly increased, even in small quantities, directly after the valve arrangement is opened. Especially in the case of small cooling outputs, such as less than 2 kW, for example, fine dosages are advantageous for forming an exact-working and sensitive or finely adjustable coolant system. The same also applies to the configuration of the cross-section-determining zones on the valve-closing member.

According to a further advantageous embodiment of the invention, it is envisaged that the gradient of the sealing-seat-forming zone is configured to be greater than 30° and the gradient of the at least one further zone is configured to be less than 30°. This means that the valve-closing member, in a closing position, can fit snugly in the valve seat and can close without self-locking, and that easy opening is enabled. Furthermore, the less than 30° gradient in the further region allows the coolant mass flow to be metered exactly.

The cross-section-determining zones of the valve arrangement can advantageously be provided by wall segments of conical, concave, convex, curved or parallel configuration, viewed in cross section. Any combination of these configurations is possible. For example, a first zone can be of conical configuration, which merges into a second conical zone. Alternatively, a first conical zone can be adjoined by a further concave zone, or a zone which is curvilinear or curved and is designed in accordance with a parabolic function or exponential function. Similarly, the first and at least one further zone can merge fluidly one into the other and can comprise a concave course or, for example, a course which is curved in accordance with a parabolic or exponential function. Alternatively, it can additionally be envisaged that the first zone is of convex configuration and forms a nozzle shape, whereas the further, adjoining zones can in turn be of conical, concave, curved or parallel configuration. The configuration of mutually parallel wall segments is advantageously intended for the through-flow of a constant mass flow volume over a certain lift travel. The further configurations of the wall segments allow, with increasing lift, an increasing mass flow.

A zone adjoining the first sealing-seat-forming zone advantageously extends in the direction of opening of the lift motion of the valve-closing member and guides the latter. A reliable and durable arrangement of a regulating apparatus for a shut-off valve can thereby be obtained with a valve arrangement according to the invention.

For the metering of the mass flow in at least one further zone, it is advantageously envisaged that the gradients of the wall segments of the valve seat are determined in dependence on the envisaged lift motion of the valve-closing member. Where the lift motion is very large and the gradient angle very small, for example, a very fine metering can thus be enabled. In such a configuration, the increase in gap width, in absolute terms, between the further zone of the valve seat and the valve-closing member is small in the event of a small change in lift travel.

A preferred embodiment envisages that the at least one further zone has a gradient of less than 10°. Directly after the valve arrangement is opened, a smooth and steady rise in mass flow can thereby be given. Preferably, the wall segments of the valve seat at the beginning of this zone specifically no longer bear against the valve-closing member, with the result that a very low through-flow is given. In particular for small cooling outputs, for example less than 2 kW, the angles are chosen such that they are very small.

The maximal mass flow flowing through the valve arrangement can advantageously be limited, when the opening lift is complete, by a gap between a transfer pin of an actuating apparatus, which transfer pin is disposed in the passage and acts upon the valve-closing member, and the wall segment of the passage, and/or a further zone, assigned to the first zone, with a valve seat which, independently of the opening lift, opens up a constant cross section between valve seat and valve-closing member. A so-called fixed restriction is thereby formed. The mass flow, independently of an increasing lift motion for opening the valve-closing member relative to the valve seat, is constant.

Advantageously, a so-called fixed restriction can also be provided between a first and a further zone with different gradients, and also between two at least further zones with different gradients, in order, for example, to provide a stepped increase in mass flow.

The invention and further advantageous embodiments and refinements of the same are described and explained in greater detail below with reference to examples represented in the drawings. The features to be drawn from the description and the drawings can be applied according to the invention individually in their own right, or severally in any combination.

DESCRIPTION OF THE PREFERRED EMBODIMENTS

Figure 1:
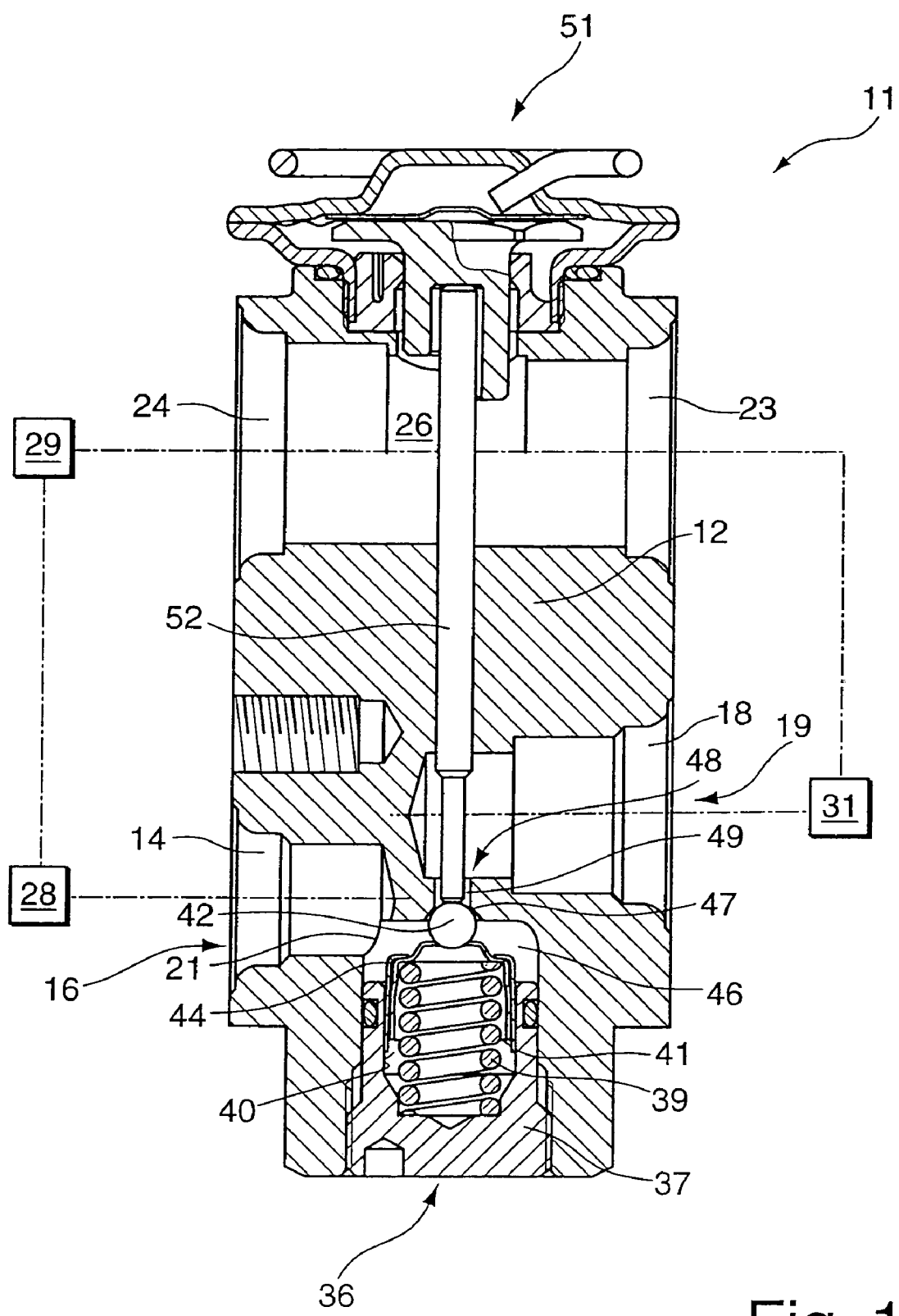
FIG. 1 shows a diagrammatic cross section through an expansion valve having a valve arrangement according to the invention.

In FIG. 1, an embodiment of an expansion valve 11 is represented. This expansion valve 11 comprises a housing 12 having a first coolant inlet opening 14 on a coolant inlet side 16, a first coolant outlet opening 18 on a first coolant outlet side 19 and a coolant duct 21 connecting the first coolant inlet opening 14 and the first coolant outlet opening 18. In the housing 12, a second coolant inlet opening 23 and a second coolant outlet opening 24 are mutually connected, furthermore, by a coolant duct 26. Connected to the first coolant outlet opening 14 is the discharge side of a condenser 28, the intake side of which is connected to the discharge side of a compressor 29. The intake side of the compressor 29 is connected to a discharge side of an evaporator 31. In the housing 12, a regulating apparatus 36, for example, can be inserted. This regulating apparatus 36 comprises an adjusting screw 37, which is configured as a hollow-cylindrical body, and an adjusting spring 39, which is positioned in the adjusting screw 37, as well as a damping sleeve 41, which embraces the adjusting spring 36 and fixes a valve-closing member 42. On the sleeve 41 there is provided a damping spring 44, which acts in the hollow-cylindrical body of the adjusting screw 37 to dampen the lift motion of a valve-closing member 42.

In the housing 12 there is provided, pointing to the regulating chamber 46, a valve seat 47, which forms with the valve-closing member 42 a valve arrangement 48. The valve seat 47 opens into a passage 49, which connects the coolant inlet side 16 to the coolant outlet side 19.

For the actuation of the regulating apparatus 36, an actuating device 51, configured as a thermal head, is provided, which, via a transfer pin 52, transports the valve-closing member 42 into an opening and a closing position.

The housing 12 represented in FIG. 1 can also be provided in the form of a so-called two-port housing, in which the second coolant inlet and outlet openings 23, 26 are not provided.

According to an alternative embodiment of the expansion valve 11, the regulating apparatus 36 can comprise a path generator, configured, for example, as a solenoid valve, and a shut-off valve.

Figure 2:
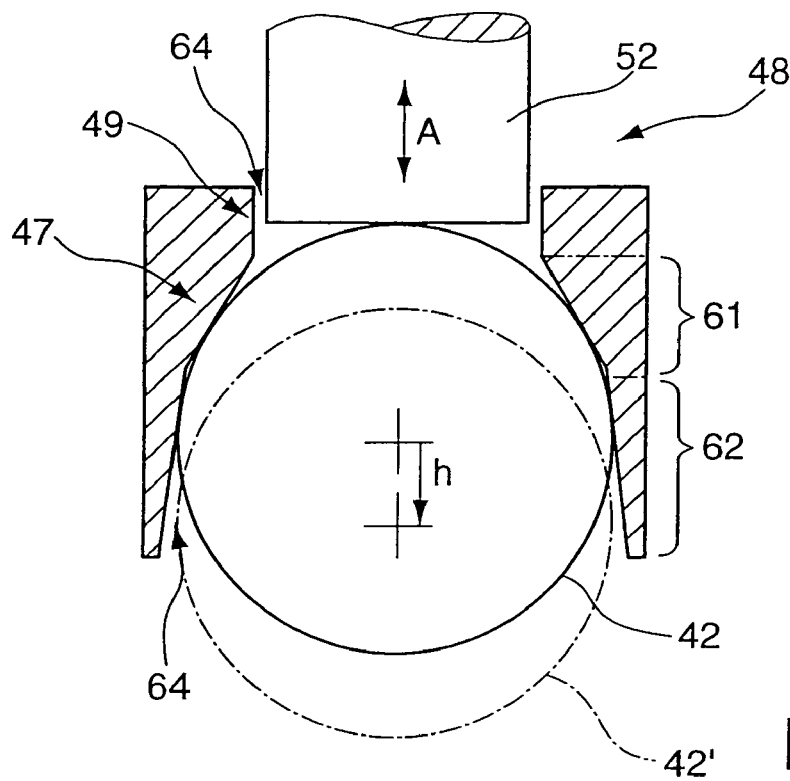
FIG. 2 shows a schematically enlarged representation of a first embodiment of a valve arrangement according to the invention.

In FIG. 2, a first embodiment of the valve arrangement 48 according to the invention is shown in schematically enlarged representation. In this valve arrangement 48, it is envisaged that the valve-closing member 42 is configured as a ball valve. The valve seat 47 comprises a first zone 61, which, in a closing position of the valve-closing member 42 relative to the valve seat 47, forms a sealing seat, whereby the passage 49 is closed. According to this illustrative embodiment, this first zone 61 is configured as a conical valve seat and has an apex angle of greater than 30°, preferably greater than 50°. A reliable bearing contact of the valve-closing member 42, in the closed state relative to the valve seat 47, is thereby given, yet a simple transfer into an opening position is given, without the need to overcome a self-locking mechanism of the valve arrangement owing to an excessively small apex angle.

This first zone 61 is adjoined by a further zone 62, which, according to the illustrative embodiment, is of conical configuration and has an apex angle of less than 30°. The gradient of the first zone 61 thus differs markedly from the further zone 62. For example, in the further zone 62, a gradient of the wall segments of less than 10° is envisaged.

The valve arrangement 48 is opened by a lift motion of the transfer pin 52 according to arrow A. A maximal lift motion is represented, for example, by arrow H. The further zone 62 is configured such that, on the one hand, a guidance of the valve-closing member 42' is given and, on the other hand, at maximal lift, a defined coolant mass flow flows through the passage 49. The size of the gradient in the further zone 62 determines the increase in mass flow in dependence on the lift travel. In addition, the mass flow is determined by the size ratio between the circumference of the valve-closing member 42 and the smallest cross-section-determining zone 62.

Figure 4:
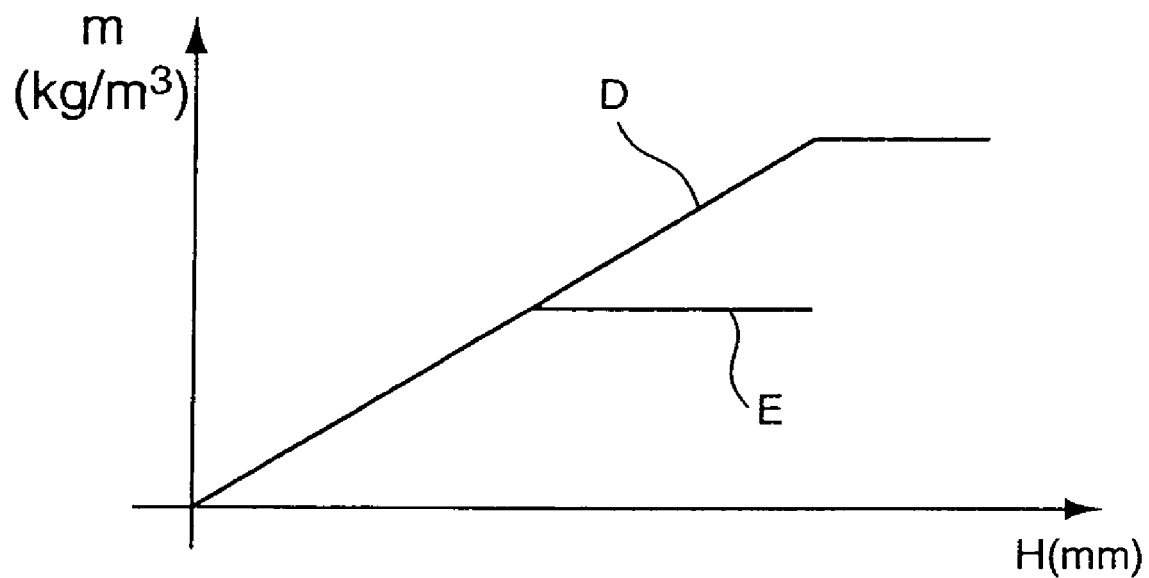
FIG. 4 shows a chart representing the mass flow as a function of the lift motion in a valve arrangement according to FIGS. 2 and 3.

FIG. 4 illustrates, for example, the characteristic curve D which is obtained by an embodiment of the valve arrangement 48 according to the invention according to FIG. 2. The characteristic curve D according to FIG. 4 merges at the end into a horizontal portion. This portion is obtained when the lift motion in the direction of opening is complete, the transfer pin 52 is positioned fully within the passage 49 and opens up a gap 64. A restriction effect is hence given, whereby the maximal volume flow is limited.

Figure 3:
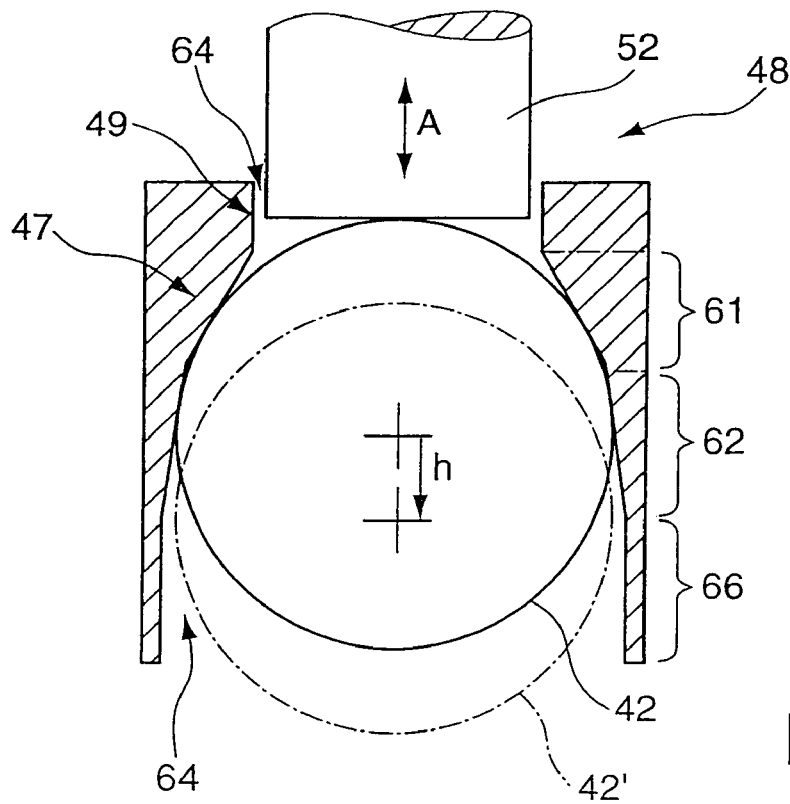
FIG. 3 shows a schematically enlarged representation of a further embodiment of a valve arrangement according to the invention.

As an alternative to the maximal volume flow limitation by the cross section of the transfer pin 52 in the passage 49, according to FIG. 3 a further zone 66 can be provided, the wall segments of which have no gradient but are configured parallel to each other. Irrespective of further increasing lift motion, a constant cross section is hence opened up between the valve-closing member 42 and the further zone 66. The characteristic curve E according to FIG. 4 shows the volume flow according to the embodiment in FIG. 3, the further portion 62, unlike in FIG. 2, being of smaller configuration, whereby the volume flow on a lower portion is limited to a constant volume.

According to an alternative embodiment (not represented in greater detail), it can be envisaged that the valve seat 47 has a first zone 61 and, where appropriate, a further zone 66, and that the end of the transfer pin which acts upon the valve-closing member 42 has a zone with a gradient, which zone, as the lift motion increases, opens up an expanding apertural cross section between the passage 49 and the transfer pin 52. Such zones can be formed, for example, by separate parts, which are connected in an application-specific manner, detachably or non-detachably, to the transfer pin 52.

The zones 61 and 62 represented in FIGS. 2 and 3 are only illustrative. The transitions between them can be fluid, or, for example, rounded. In addition, in place of a conical configuration of the zones 61 and 62, any other patterns can be provided in order to allow the desired and metered increase in mass flow in respect of a corresponding lift motion. For example, through an appropriate function, a curved course of the first and second zone can be provided, which course, at least in some sections, allows a continuous and/or discontinuous increase in mass flow. Furthermore, a stepped mass flow increase can also be formed by the provision of a zone 66, for example, between two zones 62. The gradient angle of the at least one further zone 62, together with the mass flow increase to be adjusted, is adapted to the working range of the actuating apparatus 51 or to the lift travel. The smaller the angle or gradient of the active area of the second zone 62, the smaller is the mass flow increase under the same lift motion. The further zone 62 thus forms the regulating zone for the increase in mass flow as the valve arrangement 48 is increasingly opened.

The abovementioned features of the embodiments are fundamental to the invention in their own right and can be mutually combined as desired.

The invention claimed is:

1. Expansion valve, especially for cooling units in vehicle air conditioning systems, said expansion valve comprising a valve arrangement, said valve arrangement comprising a valve-closing member and a valve seat for receiving the valve-closing member such that the valve-closing member, in a closing position, fits snugly in the valve seat and closes a passage between a coolant inlet side and a coolant outlet side, said expansion valve further comprising an actuating device which opens the valve arrangement by a lift motion of a transfer pin, wherein the valve seat or the valve-closing member has at least two zones, a first zone forming with the valve-closing member or with the valve seat, in a closing position, a seal seat, wherein the passage is closed, and at least one further zone regulating a coolant mass flow flowing through the passage, depending on the lift motion of the transfer pin and a gradient of the first zone differing from a gradient of the at least one further zone, wherein the gradient of the at least one further zone determines the mass flow in dependence on the lift motion of the valve-closing member.

2. Expansion valve according to claim 1, characterized in that the gradient of the first zone is configured to be greater than 30° and the gradient of the at least one further zone is configured to be less than 30°.

3. Expansion valve according to claim 1, characterized in that the zones are of conical, concave, convex, curved or parallel configuration, viewed in cross section.

4. Expansion valve according to claim 1, wherein the at least one further zone comprises a second zone adjoining the first zone and extending in the direction of opening of a lift motion of the valve-closing member or of the valve seat to guide the valve-closing member.

5. Expansion valve according to claim 1, characterized in that the at least one further zone has a gradient of less than 10°.

6. Expansion valve according to claim 1, characterized in that the maximal mass flow flowing through the passage is limited by a further zone of constant cross section along a predetermined length of a lift motion, which further zone is assigned to the first zone.

* * * * *